United States Patent

Mitsuhata et al.

Patent Number: 5,771,431
Date of Patent: Jun. 23, 1998

[54] IMAGE-RECEIVING SHEET FOR SUBLIMATION THERMAL TRANSFER RECORDING, AND METHOD FOR PRODUCING THE SAME

[75] Inventors: Takanori Mitsuhata; Fumio Matsui, both of Saitama; Toshio Arai, Hyogo, all of Japan

[73] Assignee: Bando Chemical Industries, Ltd., Japan

[21] Appl. No.: 817,042

[22] PCT Filed: Apr. 22, 1996

[86] PCT No.: PCT/JP96/02100

§ 371 Date: Jul. 16, 1997

§ 102(e) Date: Jul. 16, 1997

[87] PCT Pub. No.: WO97/03840

PCT Pub. Date: Feb. 6, 1997

[30] Foreign Application Priority Data

Jul. 20, 1995 [JP] Japan .................................. 7-184477

[51] Int. Cl.[6] .......................... G03G 15/16; G03G 15/20
[52] U.S. Cl. .......................... 399/307; 399/342; 399/390; 428/914; 503/227
[58] Field of Search .................................. 399/307, 297, 399/341, 342, 381, 390; 430/200, 202, 203, 211; 503/227; 428/206, 914

[56] References Cited

U.S. PATENT DOCUMENTS

| | | | |
|---|---|---|---|
| 4,168,338 | 9/1979 | Kato et al. | 428/914 X |
| 4,962,080 | 10/1990 | Watanabe | 503/227 |
| 5,135,905 | 8/1992 | Egashira et al. | 503/227 |
| 5,276,002 | 1/1994 | Okumura et al. | 503/227 |
| 5,298,945 | 3/1994 | Wada et al. | 399/307 |
| 5,318,943 | 6/1994 | Ueno et al. | 503/227 |
| 5,530,534 | 6/1996 | Dalal | 399/307 |
| 5,610,119 | 3/1997 | Ueno et al. | 503/227 |

FOREIGN PATENT DOCUMENTS

| | | |
|---|---|---|
| 61-181682 | 8/1986 | Japan . |
| 62-202791 | 9/1987 | Japan . |
| 63-178085 | 7/1988 | Japan . |
| 63-290790 | 11/1988 | Japan . |
| 2-107485 | 4/1990 | Japan . |

Primary Examiner—Sandra L. Brase
Attorney, Agent, or Firm—Wenderoth, Lind & Ponack, L.L.P.

[57] ABSTRACT

There is provided a method for forming an image-receiving sheet for sublimation thermal transfer recording, in which a photoreceptor is partly or wholly charged as it is rotated, while the powdery coating composition is charged oppositely to the photoreceptor and is then adhered to the surface of the photoreceptor, and thereafter the composition is transferred onto the base sheet, and then heated, melted and fixed, thereby to form a continuous film of the receiving layer on the base sheet.

There is further provided a white, powdery coating composition for use for the production of such an image-receiving sheet as above, which comprises a resin component, a white colorant, and a cured product of reaction-curable silicone oils and is characterized in that the composition comprises, as the resin component, from 70 to 95% by weight of a resin mixture comprising from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and comprises from 0.5 to 12% by weight of a cured product of at least two reaction-curable silicone oils having functional groups capable of mutually reacting with each other.

12 Claims, 2 Drawing Sheets

IMAGE-RECEIVING SHEET FOR SUBLIMATION THERMAL TRANSFER RECORDING, AND METHOD FOR PRODUCING THE SAME

TECHNICAL FIELD

The present invention generally relates to an image-receiving sheet for sublimation thermal transfer recording, and a method for producing the sheet.

More particularly, the invention relates to a thermal transfer image-receiving sheet for sublimation thermal transfer recording, and to a white, powdery coating composition suitable for use for forming the dye-receiving layer in such an image-receiving sheet for sublimation thermal transfer recording. The dye-receiving layer is hereinafter simply referred to as a receiving layer.

In particular, the invention relates to an image-receiving sheet for sublimation thermal transfer recording, which comprises a base sheet, preferably common paper, and a single receiving layer with good releasability and in which high-density transfer images can be formed on the layer, and also relates to a white, powdery coating composition for the image-receiving sheet and a method for producing the coating composition.

Further, the invention relates to a method for producing such an image-receiving sheet for sublimation thermal transfer recording, which comprises applying a white, powdery coating composition onto a base-sheet, preferably common paper, to thereby form a receiving layer partially or wholly thereon. More particularly, the invention relates to a simple and inexpensive method for producing such an image-receiving sheet for sublimation thermal transfer recording, on which sheet can be formed high-quality transfer images through thermal transfer recording.

BACKGROUND ART

For electrophotographic image formation, a method is known for forming multi-color images which comprises selectively exposing a photoreceptor through an original image via a color separator capable of separating the original image into predetermined primary colors, thereby forming a latent image on the photoreceptor, followed by developing the latent image into a visible image corresponding to the primary color with transferring the thus developed visible image on an image-receiving sheet one after another to give a multi-color image on the sheet. For example, with successively transferring the developed visible images of three colors of yellow, magenta and cyan, so-called full-color transfer image duplications can be formed on common paper. This system is a multi-color image-forming system using a so-called dye-transferring full-color printer.

To such full-color duplication, popularly applied is sublimation thermal transfer recording, for which, for example, employed is a thermal transfer recording system comprising preparing a thermal transfer sheet that has a sublimable dye layer as formed on a suitable support, such as a polyethylene terephthalate film (this sheet is generally referred to as an ink sheet or an ink file in the art, and will be hereinafter referred to as the former, ink sheet), while, on the other hand, separately preparing a thermal transfer image-receiving sheet having on its surface a receiving layer capable of receiving the sublimed dyes, thereafter laying the ink sheet onto the image-receivies sheet in such a manner that the surface of the dye layer of the former faces the surface of the receiving layer of the latter, then heating the ink sheet with a heating means such as a thermal head in accordance with image information to be transferred onto the image-receiving sheet to thereby thermally transfer the dyes from the ink sheet onto the receiving layer of the image-receiving sheet in accordance with the image information.

The conventional thermal transfer image-receiving sheet for such sublimation thermal transfer recording is generally produced through wet-coating of a plurality of resin layers on a base, such as common paper, synthetic paper, or suitable synthetic resin sheets, for example, in such a manner that a receiving layer made of resins to which the dyes existing on an ink sheet can be diffused or transferred under heat, and a release layer made of resins which acts to prevent the thermal fusion between the receiving layer and the ink sheet are laminated on the base sheet in that order.

Concretely, the conventional thermal transfer image-receiving sheet is produced by applying onto a base sheet a solution comprising resins to constitute a receiving layer on the base sheet, then drying the solution to thereby form the intended receiving layer of the resin on the base sheet, thereafter applying thereonto a solution comprising resins to form a release layer, and drying the solution to form the intended release layer of the resins on the receiving layer of the resins. Therefore, such a plurality of resin layers each having a different function are laminated on the base sheet. If desired, an undercoat layer or an interlayer may be formed between the base sheet and the receiving layer. Accordingly, the process for producing the conventional thermal transfer image-receiving sheet is complicated, and the production costs are high.

Apart from the recording system of the above-mentioned type, a different, thermal transfer full-color printing system has also been proposed, in which a resin layer is previously laminated on an ink sheet, the resin layer is first thermally transferred from the ink sheet onto an image-receiving sheet to form thereon a receiving layer prior to the transference of yellow, magenta, cyan and black dyes thereonto in that order, and thereafter these dyes are thermally transferred onto the thus formed receiving layer on the image-receiving sheet.

However, this system is problematic in that the first transference of the resin layer takes much time, resulting in the prolongation of the time for the intended full-color printing, that the formation of a uniform receiving layer on common paper is not easy, and that the quality of the transfer image to be finally obtained is poor. In addition, it is further problematic in that the lamination of the resin layer (this layer is, as mentioned above, to be the receiving layer on the image-receiving sheet) on the surface of the ink sheet is technically difficult.

In Japanese Patent Application Laid-open No. 1-229692, disclosed is a method for producing a thermal transfer image-receiving sheet, which comprises preparing a coating composition comprising a saturated polyester resin and other various resins along with modified silicone oils as dissolved in an organic solvent, applying this coating composition onto a base sheet such as synthetic paper, drying it to form a receiving layer of the resin on the sheet, and then heating the layer at a temperature not lower than 100° C. to thereby make the modified silicon oils bleed out onto the surface of the receiving layer and cured to form a release layer thereon. This method does not require the lamination of a plurality of resin layers each having a different function but is conducted through wet-coating that requires the drying of the solvent used. Therefore, in view of the steps constituting it and of the production costs for it, the method is disadvantageous in industrial use.

The invention has been made in order to solve the above-mentioned problems with the conventional image-receiving sheets for sublimation thermal transfer recording and also the methods for producing the sheets. Specifically, it is an object of the invention to provide a simple and inexpensive method for producing an image-receiving sheet for sublimation thermal transfer recording, in which a receiving layer is formed on a base sheet, preferably common paper, in a single step, and high-quality thermal transfer images can be formed on the image-receiving sheet thus produced according to the method of the invention.

It is a further object of the invention to provide a white, powdery coating composition, which is used in a single step process to form, on a base sheet, preferably common paper, a receiving layer made of resins with a releasability from an ink sheet, thereby easily and inexpensively producing an image-receiving sheet for sublimation thermal transfer recording; to provide the thus produced, image-receiving sheet for sublimation thermal transfer recording; and to provide a method for producing such an image-receiving sheet for sublimation thermal transfer recording.

The white, powdery coating composition of the invention can apply to dry-coating by an electrophotographic process and by other various electrostatic recording processes to form a continuous film on a base sheet, preferably common sheet, thereby producing an image-receiving sheet for sublimation thermal transfer recording which has a thin receiving layer of the white, powdery coating composition. However, the white, powdery coating composition of the invention can apply to even ordinary wet-coating also to produce such an image-receiving sheet for sublimation-type thermal transfer recording, which is advantageous in that the steps for producing the intended image-receiving sheet can be reduced.

DISCLOSURE OF THE INVENTION

The invention provides a method for producing an image-receiving sheet for sublimation thermal transfer recording that has, on a base sheet, preferably common paper, a receiving layer made of resins which, when a thermal transfer sheet having a layer of subliming dyes is attached thereto under beat, can receive the dyes from the sheet; the method being characterized in that a resin-containing, white powdery coating composition is applied onto a base sheet through a charge dispersion process to thereby make the surface of the base sheet partly or wholly coated with the composition, and then the thus-coated base sheet is heated to thereby make the composition melted and fixed thereon to form a continuous film of a receiving layer on the base sheet.

According to one of the preferred embodiments of the method of the invention for producing an image-receiving sheet for sublimation thermal transfer recording, a drum to be used to transport the powdery coating composition is partly or wholly charged, while the powdery coating composition is charged oppositely to the drum and is then adhered to the surface of the drum, and thereafter the composition is transferred onto the base sheet, and then heated, melted and fixed, thereby to form a continuous film of the receiving layer on the base sheet.

According to the most preferred embodiment of the method of the invention for forming an image-receiving sheet for sublimation thermal transfer recording, a photoreceptor is partly or wholly charged as it is rotated, while the powdery coating composition is charged oppositely to the photoreceptor and is then adhered to the surface of the photoreceptor, and thereafter the composition is transferred onto the base sheet, and then heated, melted and fixed, thereby to form a continuous film of the receiving layer on the base sheet.

The invention further provides a white, powdery coating composition for use for the production of such an image-receiving sheet for sublimation thermal transfer recording such as mentioned above. Such a white, powdery coating composition of the invention comprises a resin component, a white colorant, and a cured product of siliconeoils that are curable through reaction (the silicone oils are hereinafter referred to as reaction-curable silicone oils) and is characterized in that the composition comprises, as the resin component, from 70 to 95% by weight of a resin mixture comprising from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and comprises from 0.5 to 12% by weight of a cured product of at least two reaction-curable silicone oils having functional groups capable of mutually reacting with each other.

The white, powdery coating composition as above mentioned is obtainable according to the invention by heating and melt-kneading a mixture which comprises, as a resin component, from 70 to 95% by weight of a resin mixture comprising from 50 to 90% by weight of a saturated polyester resin having an acid value of from 1.0 to 20 mg KOH/g and a glass transition point of from 50° to 70° C., and from 10 to 50% by weight of a styrene-acrylic copolymer resin, and comprises from 0.5 to 12% by weight of a cured product of at least two reaction-curable silicone oils having functional groups capable of mutually reacting with each other.

The invention also provides an image-receiving sheet for sublimation thermal transfer recording. The image-receiving sheet for sublimation thermal transfer recording has, on a base sheet, a receiving layer which, when a thermal transfer sheet having a layer of dyes on a support is attached thereto under heat, can receive the dyes from the sheet, which is characterized in that the receiving layer is a thin continuous layer made of a white, powdery coating composition comprising a resin component, a white colorant, and a cured product of reaction-curable silicone oils, and that the composition comprises, as a resin component, from 70 to 95% by weight of a resin mixture comprising from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and comprises from 0.5 to 12% by weight of a cured product of at least two reaction-curable silicone oils having functional groups capable of mutually reacting with each other.

The image-receiving sheet for sublimation thermal transfer recording as above mentioned is, in general, obtainable according to the invention by dry-coating a white, powdery coating composition comprising a resin component, a white colorant, and a cured product of reaction-curable silicone oils, the white, powdery coating composition comprising, as the resin component, from 70 to 95% by weight of a resin mixture which comprises from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and comprising from 0.5 to 12% by weight of a cured product of at least two reaction-curable silicone oils having functional groups capable of mutually reacting with each other, on a base sheet, thereby to form thereon a thin, continuous receiving layer.

BEST MODES OF CARRYING OUT THE INVENTION

Figure 1:
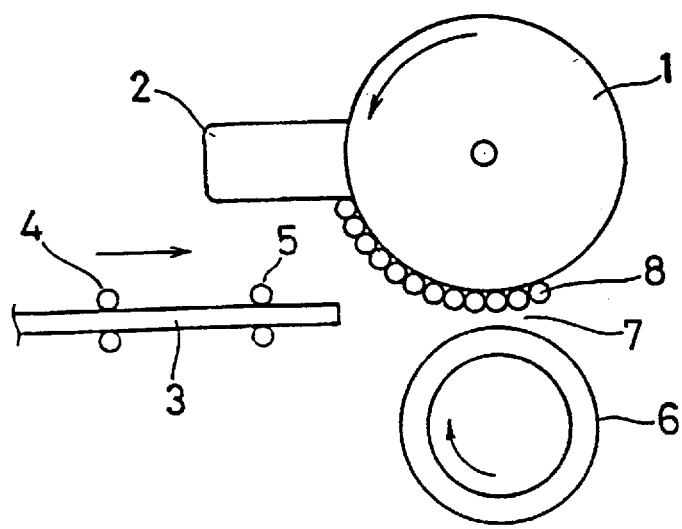
FIG. 1 is a view showing the structure of a device for producing a thermal transfer image-receiving sheet of the invention, in which a powdery coating composition is transported to a base sheet.

The method for producing an image-receiving sheet for sublimation thermal transfer recording according to the invention will be now first described, which comprises applying a resin-containing, powdery coating composition onto a base sheet through a charge dispersion process.

The charge dispersion process as referred to herein is a process in which a resin-containing powdery coating composition and a drum for transporting the composition are charged opposite to each other so that they have reversed polarities; the powdery coating composition is adhered onto the surface of the drum through electric attraction between them and is transported to a predetermined position; and then the powdery coating composition is transferred onto a base sheet, preferably common paper. In order to charge the powdery coating composition and the drum opposite to each other so that they have reversed polarities, for example, the composition and the drum may be rubbed with a brush.

One preferred embodiment of the charge dispersion process applied to the present invention is to produce a thermal transfer image-receiving sheet through so-called an electrophotographic process. According to the process, a photoreceptor is rotated while the surface of the photoreceptor is partly or wholly charged with a charging device, then a powdery coating composition that has been charged to have a reversed polarity opposite to the surface of the photoreceptor is adhered to the surface thereof, and thereafter the composition is transferred to a base sheet, melted under heat, cooled and fixed thereon to form a continuous film of a receiving layer on the base sheet.

According to the invention, where only predetermined parts of the drum or photoreceptor that correspond to the predetermined parts of a base sheet on which the intended receiving layer is formed are partly charged, then a powdery coating composition is adhered onto the thus-charged parts of the drum or photoreceptor, and thereafter the powdery coating composition is transferred onto the predetermined parts of the base sheet, then melted under heat, cooled and fixed thereon, a receiving layer can be formed partly only on the predetermined parts of the base sheet. On the other hand, where the entire surface of the photoreceptor is charged, the receiving layer can be formed on the entire surface of the base sheet. In such a case where a full-color duplication is desired to be formed partly on a base sheet, such a thermal transfer image-receiving sheet partly having a receiving layer thereon is advantageously used. In this case, it is unnecessary to use a thermal transfer image-receiving sheet having a receiving layer on its entire surface. The former that partly has a receiving layer thereon is helpful in reducing the costs for producing the thermal transfer image-receiving sheet and even in reducing the costs for full-color duplication thereon, and is therefore economical.

In particular, where the process in which a photoreceptor is charged is employed, the photoreceptor can be charged in any desired profile, configuration and pattern, as in an electrophotographic duplication process, and therefore it is possible to form a receiving layer with any desired profile, configuration and pattern on a base sheet.

The powdery coating composition used in the method of the invention comprises one or more resins. The resins act as binder resins for binding the other components constituting the composition into a powdery composition, while additionally acting to form a continuous film of a receiving layer on a base sheet and acting to receive image-forming dyes as sublimed and transferred from an ink sheet thereonto under heat, thereby attaining the thermal transfer of the dyes onto the receiving layer to form an image thereon.

The resins include, for example, saturated polyester resins, polyamide resins, polyacrylate resins, polycarbonate resins, polyurethane resins, polyvinyl acetal resins, polyvinyl chloride resins, polyvinyl acetate resins; styrenic resins such as polystyrene resins, styrene-acrylic copolymer resins, styrene-butadiene copolymer resins; as well as polyethylene resins, ethylene-vinyl acetate copolymer resins, vinyl chloride-vinyl acetate copolymer resins, vinyltoluene-acrylic resins, cellulosic resins, etc. These resins can be in the composition either singly or as suitably combined.

Various commercially available products of these resins can be used favorably. Those of usable saturated polyester resins include, for example, Bailon RV103, RV200, RV290, RV600 (all available from Toyobo Co.); KA-1038C (available from Arakawa Chemical Co.); TP-220, 235 (both available from Nippon Synthetic Chemical Industry Co.); Diaculon ER-101, FC-005, 172, 545 (all available from Mitsubishi Rayon Co.); and NE-382, 1110 (both available from Kao Corp.).

Those of usable vinyl chloride-vinyl acetate copolymer resins include, for example, Denkavinyl 1000D, 1000MT2, 1000MT3, 1000LK2, 1000ALK (all available from Denki Kagaku Kogyo K.K.); UCRA-VYHD, UCRA-VYLF (both available from Union Carbide Co.); and Eslec C (available from Sekisui Chemical Industry Co.).

Those of usable styrene-acrylic copolymer resins include, for example, Himer UNi-3000, TB-1800, TBH-1500 (all available from Sanyo Chemical Industry Co.); and CPR-100, 600B, 200, 300, XPA4799, 4800 (all available from Mitsui Toatsu Chemical Co.).

The powdery coating composition for use in the invention preferably contains a white colorant. The white colorant is incorporated in the composition in order to whiten a base sheet, preferably common paper, that is used, for example, for thermal transfer in a full-color printing system using subliming dyes.

The white colorant includes, for example, zinc flower, titanium oxide, tin oxide, antimony white, zinc sulfide, zinc oxide, barium carbonate, clay, silica, white carbon, talc, alumina or barite. In general, titanium oxide is preferred. The white colorant may be contained in the powdery coating composition usually in an amount of from 0.5 to 15% by weight, preferably from 1 to 10% by weight.

Further preferably, the powdery coating composition for use in the method of the invention contains an antistatic agent and an offset inhibitor. The antistatic agent is a fine granular solid, and is incorporated in the composition in order to impart necessary frictional electrification to so-called toner in various recording systems, such as the before-mentioned charge dispersion process and electrophotographic process, and other electrostatic latent image-forming processes. Various antistatic agents are known, among which are metal-containing dyes. For example, in Japanese Patent Application Laid-Open No. 5-323664, various antistatic agents with various polarities are disclosed. The powdery coating composition may contain the antistatic agent usually in an amount of from 0.1 to 15% by weight, preferably from 1 to 10% by weight.

As the offset inhibitor, in general, various waxes having a melting point of from 50° to 150° C. are preferred. Concretely mentioned are paraffin wax, polyolefin waxes, such as polyethylene or polypropylene wax, as well as metal salts of fatty acids, esters of fatty acids, higher fatty acids, or higher alcohols. The powdery coating composition may contain the offset inhibitor usually in an amount of from 0.1 to 20% by weight, preferably from 0.5 to 10% by weight.

In order to improve the fluidity of the powdery coating composition, a so-called fluidity-improving agent, such as hydrophobic silica, may be added to the composition, if desired. The coating composition may contain the fluidity-improving agent usually in an amount of one part by weight or less, preferably from 0.1 to 5 parts by weight, more preferably from 0.2 to 2 parts by weight, relative to 100 parts by weight of the composition.

The powdery coating composition for use in the invention can be prepared by mixing the constitutive components such as those mentioned hereinabove, melt-kneaded, then cooled, ground and classified them to give particles having a suitable mean particle size. The powdery coating composition for use in the invention usually has a mean particle size of from 1 to 30 $\mu$m, preferably from 5 to 20 $\mu$m.

As the base sheet for the thermal transfer image-receiving sheet produced according to the method of the invention is preferably common paper. Common paper as referred to herein includes, for example, ordinary PPC copying paper, PPC copying paper as calendered to have improved surface smoothness, surface-treated paper for thermal transfer-type word processors, and coated paper, among others.

According to the method of the invention, preferably, the above-mentioned, powder coating composition is partly or entirely uniformly adhered onto the surface of a base sheet, preferably common paper, then melted under heat, thereafter cooled to form a uniform, continuous film of a receiving layer on the base sheet. The receiving layer thus formed may have a thickness of usually from one to 20 $\mu$m, preferably from 5 to 10 $\mu$m.

One embodiment of the method of the invention for producing a thermal transfer image-receiving sheet through the charge dispersion process is described hereinunder with reference to the drawings attached hereto.

As shown in FIG. 1, a powdery coating composition is transported to a predetermined position at which a base sheet is coated with the composition via a drum 1, which is rotatably supported. Adjacent to this drum 1, a stocker 2 is disposed which contains the composition therein. The composition and the drum are both rubbed, for example, with a brush (not shown) as disposed in the stocker and are therefore charged to have reversed polarities opposite to each other. Thus, the composition adheres onto the drum and is transported to the predetermined position.

Figure 2:
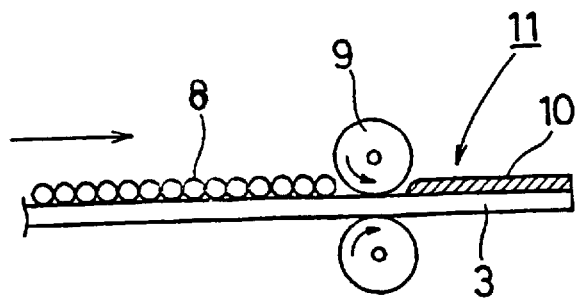
FIG. 2 is a view showing the structure of a device for producing a thermal transfer image-receiving sheet of the invention, in which the composition as transferred onto the base sheet is fixed thereon to form a receiving layer on the base sheet.

On the other hand, a base sheet 3, common paper, for a thermal transfer image-receiving sheet is transported in the direction of the arrow shown in FIG. 1 to the position at which it is coated with the composition, with use of the rollers 4 and 5 in accordance with the rotation of the drum, and in that position, the powdery coating composition 8 is transferred under pressure onto the base sheet 3. Then, as shown in FIG. 2, the base sheet 3 thus coated with the composition 8 is transported to the fixing part 9, at which the composition 8 is melted under heat, then cooled and fixed onto the base sheet to form a continuous film of a receiving layer 10 thereon. In this way, there is obtained a thermal transfer image-receiving sheet 11. The fixing part may be composed of, for example, a pair of hot rollers. The receiving layer thus formed has a thickness usually in the range of from one to 20 $\mu$m.

Figure 3:
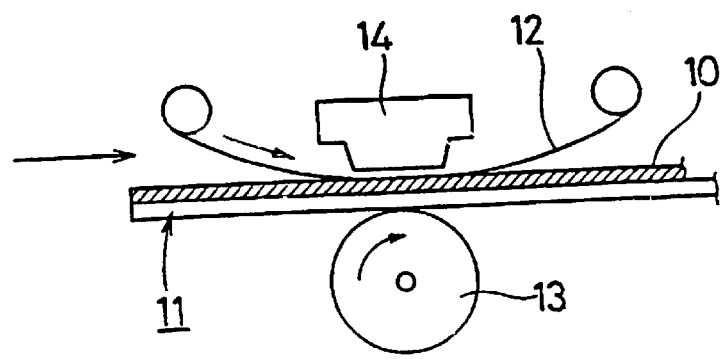
FIG. 3 is a view showing the structure of a device, in which dyes are transferred from an ink sheet onto a thermal transfer image-receiving sheet to form an image on the latter sheet.

FIG. 3 is now referred to. To thermally transfer the dyes existing on an ink sheet 12 onto the thus-produced thermal transfer image-receiving sheet 11 to form an image on the latter, as shown in FIG. 3, the sheet 11 is introduced onto a platen roller 13, on which the ink sheet is heated with, for example, a thermal head 14 in accordance with image information applied thereto, whereby the subliming dyes existing on the ink sheet are thermally transferred onto the receiving layer 10 of the thermal transfer image-receiving sheet to give an image on the layer 10.

According to the invention, the thermal transfer image-receiving sheet can be produced through dry-coating in an electrophotographic process which itself is well known in the art. In more detail, for example, the surface of a photoreceptor (drum) is partly or wholly charged with a charging device, while on the other hand, the powdery coating composition or a toner is mixed with a carrier, usually an iron powder, and charged to have a reversed polarity opposite to the photoreceptor through friction with the iron powder, then the composition is adhered to the photoreceptor, and thereafter the composition is transported to a predetermined position by the photoreceptor which is driven to rotate, at which the composition is transferred from the photoreceptor onto a base sheet.

Figure 4:
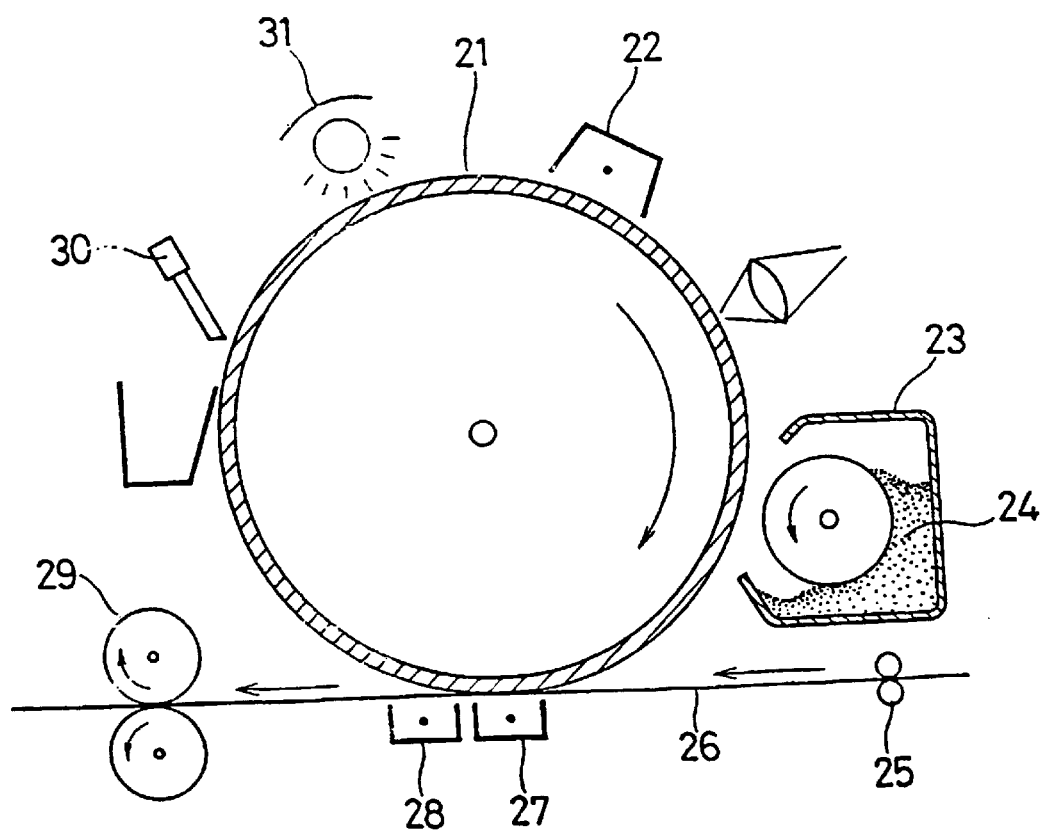
FIG. 4 is a view showing the structure of a device for producing a thermal transfer image-receiving sheet of the invention through electrophotography.

More specifically, as shown in FIG. 4, a photoreceptor (drum) 21 is, while being rotated, charged either partly only on a predetermined portion of its surface or wholly on the surface, using a corona-charging device 22, and thereafter a toner 24 that has been charged to have a reversed polarity opposite to the surface of the photoreceptor is supplied from a developer container 23 onto the thus-charged surface of the photoreceptor to thereby make the toner 24 adhered onto the charged part of the photoreceptor to form a toner image thereon. A base sheet 26, common paper is then introduced onto the transfer part 27 and the separation part 28, at which the toner is transferred onto the common paper, and thereafter the toner is melted under heat and cooled on the paper at the fixing part 29. Thus, the toner is fixed on the common paper to form thereon a continuous toner layer film, which is a continuous receiving layer having a uniform thickness. According to this process using the toner as a developer, a white, solid toner image is formed partly on a desired portion of the surface of the base sheet or, if desired, entirely on the surface thereof.

In general, the thickness of the receiving layer formed in this manner falls preferably between one to 20 $\mu$m. When some toner remains on the photoreceptor, it may be removed therefrom with a cleaning device 30, if desired. Finally, the photoreceptor is exposed to light at a photo-discharging part 31 to thereby discharge the surface of the photoreceptor.

Next, the white, powdery coating composition which is especially suitable for use for the production of the image-receiving sheet for sublimation thermal transfer recording of the present invention is described hereinunder along with the method for producing the composition.

The white, powdery coating composition for the image-receiving sheet for sublimation thermal transfer recording of the invention comprises, as the resin component, from 70 to 95% by weight of a resin mixture comprising from 50 to 90% by weight of a saturated polyester resin having a glass transition point of from 50° to 70° C. and from 10 to 50% by weight of a styrene-acrylic copolymer resin, based on the coating composition.

The saturated polyester resin used in the composition is a polymer obtainable through polycondensation of a dicarboxylic acid and a dihydric alcohol. The dicarboxylic acid is not specifically limited, and includes, for example, aliphatic dibasic acids such as malonic acid, succinic acid, glutaric acid, adipic acid, azelaic acid, sebacic acid and hexahydrophthalic anhydride; and aromatic dibasic acids such as phthalic anhydride, phthalic acid, terephthalic acid and isophthalic acid. If desired, tribasic or higher polybasic acids can be additionally used for the polycondensation. Such polybasic acids include, for example, trimellitic anhydride and pyromellitic anhydride.

The dihydric alcohol is not also specifically limited, and includes, for example, ethylene glycol, propylene glycol, butylene glycol, hexanediol, neopentyl glycol, diethylene glycol, dipropylene glycol and hydrogenated bisphenol A.

If desired, trihydric or higher polyhydric alcohols may be added thereto. Such polyhydric alcohols include, for example, glycerin, trimethylolpropane, diglycerin, pentaerythritol and sorbitol.

The saturated polyester resin for use in the present invention must have an acid value of from 1.0 to 20 mg KOH/g and a glass transition point of from 50° to 70° C. Commercially available products of such a saturated polyester resin can be favorably used herein, which include, for example, Bailon RV103, RV200, RV290 (all available from Toyobo Co.), KA-1038C (available from Arakawa Chemical Co.), TP-220, 235 (both available from Nippon Synthetic Chemical Industry Co.), Diaculon ER-101, FC-005, 172, 545 (all available from Mitsubishi Rayon Co.), and NE-382, 1110 (both available from Kao Corp.).

When saturated polyester resins with no acid value are used herein, the thermal transfer of dyes onto the thermal transfer image-receiving sheet is unsatisfactory, and high-density transfer images cannot be formed on the sheet. However, when saturated polyester resins having a too high acid value are used, an ink sheet is fused to the thermal transfer image-receiving sheet when heated for thermal transferring, with the result that the formation itself of transfer images on the image-receiving sheet cannot be attained. When saturated polyester resins having a too low glass transition point are used, an ink sheet is also fused to the thermal transfer image-receiving sheet when heated for thermal transferring, with the result that the formation itself of transfer images on the image-receiving sheet cannot be attained.

The styrene-acrylic copolymer resin is a copolymer of styrene and a (meth)acrylate. The (meth)acrylate includes, for example, ethyl acrylate, butyl acrylate, methyl methacrylate, ethyl methacrylate, butyl methacrylate, 2-ethylhexyl methacrylate, 2-hydroxyethyl acrylate, dimethylaminoethyl methacrylate and diethylaminoethyl methacrylate. Preferred examples of the styrene-acrylic copolymer resin for use in the invention include styrene-butyl acrylate copolymers, styrene-butyl methacrylate copolymers, styrene-methyl methacrylate copolymers, and mixtures of these.

Various commercially available products of the styrene-acrylic copolymer resin are preferably used in the invention, which include, for example, Himer-UNi-3000, TB-1800, TBH-1500 (all available from Sanyo Chemical Industry Co.) and CPR-100, 600B, 200, 300, XPA4799, 4800 (all available from Mitsui Toatsu Chemical Co.).

The white, powdery coating composition for the image-receiving sheet for sublimation-type thermal transfer recording of the invention comprises, as the resin component, from 70 to 95% by weight of a resin mixture comprising from 50 to 90% by weight of a saturated polyester resin such as that mentioned hereinabove and from 10 to 50% by weight of a styrene-acrylic copolymer resin such as that mentioned hereinabove.

Of the resin component, the saturated polyester resin is highly accetable of dyes from an ink sheet being heated. On the other hand, the cured product of reaction-curable silicone oils acts to make the thermal transfer image-receiving sheet releasable from an ink sheet after the completion of the thermal transference of the dyes from the ink sheet to the image-receiving sheet. In order to enhance the releasability of the image-receiving sheet from an ink sheet, the amount of the reaction-curable silicone oils in the coating composition might be increased. However, if too much amount of such oils is incorporated in the composition, the density of the images transferred onto the image-receiving sheet is greatly lowered. According to the invention, therefore, the coating composition shall contain, as the resin component, a resin mixture comprising from 50 to 90% by weight of a saturated polyester resin such as that mentioned hereinabove and from 10 to 50% by weight of a styrene-acrylic copolymer resin such as that mentioned hereinabove so that the high density of the images is formed on the image-receiving sheet while increasing the releasability of the sheet, due to the action of the saturated polyester resin.

When the saturated polyester resin content of the resin component is higher than 90% by weight, an ink sheet is often fused to the thermal transfer image-receiving sheet during thermal transferring therebetween though the images transferred onto the image-receiving sheet may have relatively high density. On the other hand, when the saturated polyester resin content of the resin component is lower than 50% by weight, or that is, when the styrene-acrylic copolymer resin content thereof is higher than 50% by weight, the image density obtained is unsatisfactory though the releasability of the image-receiving sheet is high.

The white, powdery coating composition for the thermal transfer image-receiving sheet of the invention comprises, in addition to the above-mentioned resin component and white colorant, the cured product of at least two reaction-curable silicone oils having functional groups capable of mutually reacting with each other. The cured product is formed through the rection of the functional groups of the oils. The cured product acts to make the image-receiving sheet releasable from an ink sheet after the completion of the thermal transference of the dyes from the latter sheet to the former sheet.

The reaction-curable silicone oils having functional groups capable of mutually reacting with each other are, for example, polysiloxanes, usually dimethylpolysiloxane, which have reactive groups such as amino, epoxy, carboxyl, carbinol, methacrylic, mercapto or phenol group, as pending reoups or at the molecular terminals. Various products of such reaction-curable oils are commercially available. Such commercially available products can be suitably used in consideration of the reactivity of the functional groups therein in the invention.

For example, as commercially available products of amino-modified silicone oils, there are mentioned KF-393, 861, 864, X-22-161A (all products of Shin-etsu Chemical Industry Co.); as those of epoxy-modified silicone oils, there are mentioned KF-101, 103, 105 (all products of Shin-etsu Chemical Industry Co.); as those of carboxyl-modified silicone oils, there are mentioned X-22-162A, X-22-3710 (both products of Shin-etsu Chemical Industry Co.); and as those of carbinol-modified silicone oil, there are mentioned X-22-162AS, KF-6001 (both products of Shin-etsu Chemical Industry Co.). For these silicone oils, their properties and methods for producing them are described in detail, for example, in "Silicone Handbook" (published by Nikkan Kogyo Newspaper Co., Aug. 31, 1990).

Of these, preferably used in the invention are combinations of modified silicone oils with amino or hydroxyl groups, and modified silicones with epoxy, isocyanato or carboxyl groups. A combination of an amino-modified silicone oil and an epoxy-modified silicone oil is especially preferred. Such two reaction-curable silicone oils are used in such a manner that the functional groups capable of mutually reacting with each other in these may be equivalent.

The white, powdery coating composition for the thermal transfer image-receiving sheet of the invention comprises from 0.5 to 12% by weight, preferably from 0.5 to 10% by weight, of the cured product of at least two reaction-curable silicone oils having functional groups capable of mutually reacting with each other, such as those mentioned hereinabove. When the amount of the cured product in the composition is smaller than 0.5% by weight: the releasability of the thermal transfer image-receiving material is unsatisfactory so that an ink sheet is fused onto the thermal transfer image-receiving sheet during thermal transferring therebetween and high-quality images cannot be formed on the image-receiving sheet. On the other hand, when the amount of the cured product in the composition is larger than 12% by weight, the density of transfer images formed is poor since the amount of the cured product is too much.

The white colorant used in the white, powdery coating composition includes, for example, zinc flower, titanium oxide, tin oxide, antimony oxide, zinc sulfide, barium carbonate, clay, silica, white carbon, talc, alumina or barite among others. In general, titanium oxide is preferred. The white colorant may be incorporated in the composition in an amount usually of from 0.5 to 15% by weight, preferably from 1 to 10% by weight.

The white, powdery coating composition for the thermal transfer image-receiving sheet of the invention can be obtained by melt-kneading under heat a mixture comprising, as the resin component, a resin mixture of from 50 to 90% by weight of a saturated polyester resin having an acid value of from 1.0 to 20 mg KOH/g and a glass transition point of from 50 to 70 C., such as that mentioned hereinabove, and from 10 to 50% by weight of a styrene-acrylic copolymer resin such as that mentioned hereinabove, and comprising from 0.5 to 12% by weight of at least two reaction-curable silicone oils having functional groups capable of mutually reactive with each other, such as those mentioned hereinabove.

The above-mentioned mixture is melt-kneaded usually at about 100°–200° C., preferably at about 130°–180° C., for several minutes, usually for about 3–5 minutes. During the kneading, at least two such reaction-curable silicone oils mutually react with each other to form a cured product. However, the heating temperature and time are not specifically limited, and the heating of the mixture can be conducted under any conditions under which the resin component, the reaction-curable silicone oils and the white colorant are uniformly mixed together with other components, such as an antistatic agent and an offset inhibitor which will be referred to hereinunder, while the reaction-curable silicone oils are mutually reacted with each other to form a cured product.

Where the white, powdery coating composition of the invention is applied onto a base sheet through dry-coating in various electrostatic recording processes, for example, in an electrophotographic process, it is preferred that the coating composition comprises an antistatic agent and an offset inhibitor.

The thermal transfer image-receiving sheet of the invention is obtainable by forming a continuous thin layer of a white coating composition as set forth mentioned hereinabove, on a suitable base sheet either entirely or partly on its surface. The base sheet may be any of synthetic paper, synthetic resin sheets, paper, etc. The synthetic resin sheets include, for example, sheets of polyesters, polyvinyl chloride, polyethylene, polypropylene, polycarbonates, polyamides or the like. The synthetic paper may be such that it is produced, for example, by sheeting a resin component comprising any of polyolefin resins and any other synthetic resins optionally along with any desired inorganic filler and others, through extrusion. Paper may be common paper made of ordinary cellulose fibers, including even high-quality paper and coated paper among others. In the invention, common paper may be especially advantageously used as the base sheet.

Even more advantageously, according to the invention, thermal transfer image-receiving paper can be produced simply and inexpensively by a common electrophotographic process using common paper. According to this embodiment, the photoreceptor is entirely uniformly charged, and then, if desired, optionally partly exposed, while, on the other hand, the above-mentioned, white powdery coating composition, that is, a toner, is mixed with a carrier, which may be generally an iron powder, to give a developer; then the resulting developer is electrostatically adhered onto the whole surface of the photoreceptor if charged entirely, or onto the charged part of the surface of the photoreceptor if partly charged; and thereafter the toner is transferred from the photoreceptor onto the base sheet, melted under heat and cooled thereon to form a continuous thin film or layer on the base sheet. The hus-formed, continuous thin film or layer is the intended receiving layer.

The carrier is not limited to only the above-mentioned iron powder but may be any known one. Depending on the polarity of the toner to be charged, the carrier to be added to the toner is suitably selected.

According to the electrophotographic process as mentioned above, it is possible with ease not only to form the receiving layer on the entire surface of common paper but also to form the same partly only on a predetermined portion of common paper.

Without being limited to only such an electrophotographic process exemplified hereinabove, any dry-coating processes according to any other electrostatic recording processes using so-called toners can be employed herein to produce the thermal transfer image-receiving sheet of the invention.

In addition, the thermal transfer image-receiving sheet of the invention may also be produced by any other wet-coating processes where a white coating composition such as that mentioned above is dissolved or dispersed in a suitable organic solvent and the resulting solution or dispersion is wet-coated on a base sheet and then dried thereon under heat. According to such wet-coating processes using the white powdery composition of the invention, only a single receiving-layer may be formed on the base sheet to give the intended, thermal transfer image-receiving sheet, being different from the conventional methods comprising forming on a base sheet a plurality of resin layers each having a different function in order to produce a thermal transfer image-receiving sheet with such plural layers laminated on the base sheet. Thus, the former using the coating composition of the invention is superior to the latter conventional methods in that the steps for the former are smaller than those for the latter.

INDUSTRIAL APPLICABILITY

As set forth above, an image-receiving sheet for sublimation thermal transfer recording can be obtained according to the method of the invention comprising only a single step for a charge dispersion process, in which a resin-containing, powdery coating composition is uniformly adhered onto a base sheet, preferably common paper, either partly if desired or entirely on its surface, then melting it under heat, cooled and fixed to form a continuous film of a receiving layer on the base sheet.

Therefore, according to the method of the invention, a receiving layer capable of receiving sublimed dyes can be formed simply and inexpensively on a base sheet including common paper, either partly if desired or entirely on its surface, to give a thermal transfer image-receiving sheet. Moreover, the time necessary for producing the thermal transfer image-receiving sheet is much shortened as compared with that necessary for producing the conventional, multi-layered, thermal transfer image-receiving sheets such as those mentioned hereinabove. Accordingly, combining the production of the thermal transfer image-receiving sheet according to the method of the invention and the thermal transference of images from an ink sheet to the thus-produced image-receiving sheet of the invention, the time necessary for the formation of full-color images on the image-receiving sheet through thermal transference is much shortened as compared with that necessary for the formation of full-color images on the conventional thermal transfer image-receiving sheets. Moreover, the transfer images thus formed on the image-receiving sheet of the invention are of high quality.

The white, powdery coating composition for the thermal transfer image-receiving sheet of the invention comprises, a white colorant, a resin component of a resin mixture comprising a polyester resin having an acid value falling within a particular range and a glass transition point falling within a particular range, and a styrene-acrylic copolymer resin at a ratio falling within a particular range, and even a cured product of at least two reaction-curable silicone oils having functional groups capable of mutually reacting with each other. Using this composition, a resin-containing receiving layer with good releasability can be formed on a base sheet in a single coating step to give a thermal transfer image-receiving sheet.

In particular, the white, powdery coating composition of the invention can be easily coated even on common paper to give a receiving layer thereon, through ordinary dry-coating in, for example, an electrophotographic process and other various electrostatic latent image-forming processes.

Being different from the conventional ones each having a plurality of resin layers, the sublimation thermal transfer image-receiving sheet of the invention which can be obtained in the manner as mentioned hereinabove has a single resin layer and is not fused to an ink sheet attached thereto for thermal transferring of images. In addition, the dyes as once transferred onto the receiving layer of the image-receiving sheet of the invention are not peeled off. Thus, high-density and high-quality images can be formed on the image-receiving sheet of the invention.

Accordingly, applying the invention to a full-color printer where a receiving layer is formed on common paper through an electrophotographic process to give a thermal transfer image-receiving sheet and images are thermally transferred onto the sheet, multi-color images can be immediately formed on common paper.

Now, the invention will be described with reference to the following examples, which, however, are not intended to restrict the scope of the invention. The parts and percents are by weight unless otherwise specified.

EXAMPLE 1

| | |
|---|---|
| Styrene-acrylic Copolymer Resin (CPR-100, product of Mitsui Toatsu Chemical Co.) | 100 parts |
| Titanium Oxide | 5 parts |
| Antistatic Agent (Bontron P-51, product of Orient Chemical Co., benzyltributyl-ammonium α-naphthol-4-sulfonate) | 2 parts |

A raw material comprising the components above was mixed in a mixer, and then melt-kneaded in a double-screw melt-kneader. After having been cooled, the resulting mixture was ground and classified to obtain a white, powdery coating composition having a mean particle size of 11.5 μm. 100 parts by weight of this powdery coating composition was mixed with 0.5 parts of a fluidity improver, hydrophobic silica (R-FYC, product of Nippon Aerosil Co.) to prepare a toner.

Next, this toner was mixed with a carrier (iron powder) to prepare a developer having a toner concentration of 8.4% by weight.

(Production of Thermal Transfer Image-receiving Paper)

Using a commercially available, two-component development-type duplicates, the developer prepared above was applied onto commercially available common paper to make the toner adhered onto the entire surface of the paper. Thus, white, thermal transfer image-receiving paper was produced.

(Thermal Transfer of Sublimable Dyes onto Image-receiving Paper)

Using a high-speed printer of a sublimation thermal transfer process, an ink sheet mentioned below was attached to the thermal transfer image-receiving paper prepared hereinabove, with the surface of the dye layer of the former facing the receiving layer of the latter, and the ink sheet was heated with a thermal head thereby making the dyes transferred onto the receiving layer of the thermal transfer image-receiving paper. In the transfer image obtained herein, the optical densities (of yellow, magenta and cyan) were measured; and the releasability of the ink sheet from the image-transferred paper was observed. The results are shown in Table 1.

Transference Conditions Employed Herein for the High-speed Printer of Sublimation Thermal Transfer System:

Thermal Head: KGT-219-12MPL2 (produced by Kyocera Co.)

Driving Voltage: 17 V

Line Speed: 4 ms

Sublimable Dyes in Ink Sheet:

Sublimable Yellow Dye: styryl-type yellow dye

Sublimable Magenta Dye: anthraquinone-type magenta dye

Sublimable Cyan Dye: indaniline-type cyan dye

Test Method:

For the optical densities of the transfer image formed, the reflection densities were measured with a densitometer (PDA-60, produced by Konica Co.).

To determine the releasability of the ink sheet from the image-transferred paper, the presence or absence of white spots were checked in the transfer image caused by the peeling of the transferred dyes from the receiving layer of the paper. The presence or absence of the adhesion of the ink film onto the receiving layer of the paper were also checked. In all the image-transferred paper samples tested herein, there occurred neither the peeling nor the adhesion.

EXAMPLE 2

| | |
|---|---|
| Vinyl Chloride-Vinyl Acetate Copolymer Resin (Denka vinyl 1000 ALK) | 100 parts |
| Titanium Oxide | 20 parts |
| Antistatic Agent (Copycharge NEG VP2036, product of Hoechst Co.) | 2 parts |
| Polyvinyl Chloride Resin Stabilizer | 5.5 parts |

A raw material comprising the components above was mixed in a mixer, and then melt-kneaded in a double-screw melt-kneader. After having been cooled, the resulting mixture was ground and classified to obtain a white, powdery coating composition having a mean particle size of 9.5 μm. 100 parts of this powdery coating composition was mixed with 0.5 parts of a fluidity improver, hydrophobic silica (R-FYC, product of Nippon Aerosil Co.) to prepare a toner.

Next, this toner was mixed with a carrier (iron powder) to prepare a developer having a toner concentration of 8.4% by weight.

Using a commercially available, two-component development-type duplicator in the same manner as in Example 1, the developer prepared herein was applied onto commercially-available common paper to make the toner adhered onto the entire surface of the paper. Thus, white, thermal transfer image-receiving paper was produced. Also in the same manner as in Example 1, dyes were transferred onto the paper, and the optical densities (of yellow, magenta and cyan) in the transfer image obtained were measured, and the releasability of the ink sheet from the image-transferred paper was observed. The results are shown in Table 1.

To determine the releasability of the ink sheet from the image-transferred paper, the presence or absence of white spots were checked in the transfer image caused by the peeling of the transferred dyes from the receiving layer of the paper. The presence or absence of the adhesion of the ink film onto the receiving layer of the paper were also checked in the same manner as in Example 1. In all the image-transferred paper samples tested herein, there occurred neither the peeling nor the adhesion.

TABLE 1

| | Examples | |
|---|---|---|
| Optical Density | 1 | 2 |
| Yellow | 1.43 | 1.82 |
| Magenta | 1.21 | 1.86 |
| Cyan | 1.33 | 2.01 |

In the following examples, the data as parenthesized indicate the proportions of the components relative to the resin component of being 100% by weight.

EXAMPLE 3

(Production of White Powdery Coating Composition)

| | |
|---|---|
| Saturated Polyester Resin (NE-382, product of Kao Corp.: having an acid value of 8.9 mg KOH/g and a glass transition point of 62.6° C.) | 71% (80.7%) |
| Styrene-acrylic Copolymer Resin (CPR-200, product of Mitsui Toatsu Chemical Co.) | 17% (19.3%) |
| Offset Inhibitor (wax, Biscol 330P, product of Sanyo Chemical Co.) | 4% |
| Antistatic Agent (Bontron P-51, product of Orient Chemical Co., benzyltributyl-ammonium α-naphthol-4-sulfonate) | 2% |
| Titanium Oxide | 5% |
| Amino-modified Silicone Oil (KF-861, product of Shin-etsu Chemical Industry Co.) | 0.5% |
| Epoxy-modified Silicone Oil (KF-102, product of Shin-etsu Chemical Industry Co.) | 0.5% |

A raw material comprising the components above was mixed in a mixer, and then melt-kneaded in a double-screw melt-kneader at a temperature of 150°–160° C. for about 3–5 minutes. After having been cooled, the resulting mixture was ground and classified to obtain a white, powdery coating composition having a mean particle size of from 9 to 10 μm. 100 parts of this powdery coating composition was mixed with 0.5 parts of hydrophobic silica (RP-200H, product of Nippon Aerosil Co.) to prepare a toner.

Next, this toner was mixed with a carrier (iron powder) to prepare a developer having a toner concentration of 8.4%.
(Production of Thermal Transfer Image-receiving Paper)

Using a commercially-available, two-component development-type duplicator, the developer prepared hereinabove was applied onto commercially-available common paper to make the toner adhered onto the entire surface of the paper. Thus, white, thermal transfer image-receiving paper was produced.
(Thermal Transfer of Subliming Dyes onto Image-receiving Paper)

Using a high-speed printer of a sublimation thermal transfer system, an ink sheet mentioned below was attached to the thermal transfer image-receiving paper prepared hereinabove, with the surface of the dye layer of the former facing the receiving layer of the latter, and the ink sheet was heated with a thermal head thereby making the dyes transferred onto the receiving layer of the thermal transfer image-receiving paper. In the transfer image obtained herein, the optical densities (of yellow, magenta and cyan) were measured; and the releasability of the ink sheet from the image-transferred paper was observed. The results are shown in Table 2.

Transference Conditions Employed Herein for the High-speed Printer of Sublimation Thermal Transfer System:
Thermal Head: KGT-219-12MPL2 (produced by Kyosera Co.)
Driving Voltage: 17 V
Line Speed: 4 ms⁻
Sublimable Dyes in Ink Sheet:
Sublimable Yellow Dye: styryl-type yellow dye
Sublimable Magenta Dye: anthraquinone-type magenta dye
Sublimable Cyan Dye: indaniline-type cyan dye
Test Method:
For the optical densities of the transfer image formed, the reflection densities were measured with a densitometer (PDA-60, produced by Konica Co.).

To determine the releasability of the ink sheet from the image-transferred paper, the following four matters were checked from which the releasability was evaluated in three ranks.

(1) Possibility of high-speed printing.
(2) Presence or absence of white spots in the transfer image caused by the peeling of the receiving layer.
(3) Presence or absence of adhesion of the ink sheet to the receiving layer.
(4) Noise occured when the ink sheet was peeled from the image-transferred paper.
A: Small noise occurred; neither peeling of the receiving layer nor adhesion of the ink sheet occurred.
B: Large noise occurred: a little peeling of the receiving layer and a little adhesion of the ink sheet occurred.
C: High-speed printing was impossible; great peeling of the receiving layer and great adhesion of the ink sheet occurred.

EXAMPLE 4

In the same manner as in Example 3, except that the raw material comprised 71% of a saturated polyester resin, NE-1110 (product of Kao Corp.; having an acid value of 8.9 mg KOH/g and a glass transition point of 62.6° C.), there was obtained white, thermal transfer image-receiving paper. This was subjected to the same thermal transfer test as in Example 3. The results are shown in Table 2.

EXAMPLE 5

In the same manner as in Example 3, except that the raw material comprised 71% of a saturated polyester resin, Diaculon FC-545 (product of Mitsubishi Rayon Co.; having an acid value of 4.1 mg KOH/g and a glass transition point of 52.5° C.), there was obtained white, thermal transfer image-receiving paper. This was subjected to the same thermal transfer test as in Example 3. The results are shown in Table 2.

COMPARATIVE EXAMPLE 1

In the same manner as in Example 3, except that the raw material comprised 71% of a saturated polyester resin, Bailon RV220 (product of Toyobo Co.; having no acid value but having a glass transition point of 67° C.), there was obtained white, thermal transfer image-receiving paper.

This was subjected to the same thermal transfer test as in Example 3. The results are shown in Table 2.

COMPARATIVE EXAMPLE 2

In the same manner as in Example 3, except that the raw material comprised 71% of a saturated polyester resin, Bailon RV600 (product of Toyobo Co.; having a glass transition point of 45° C.), there was obtained was white, thermal transfer image-receiving paper. This was subjected to the same thermal transfer test as in Example 3. The results are shown in Table 2.

COMPARATIVE EXAMPLE 3

In the same manner as in Example 3, except that the raw material comprised 71% of a saturated polyester resin, RP-301 (product of Nippon Synthetic Chemical Industry Co.; having an acid value of 30 mg KOH/g and a glass transition point of 62° C.), there was obtained was white, thermal transfer image-receiving paper. This was subjected to the same thermal transfer test as in Example 3. The results are shown in Table 2.

EXAMPLE 6

In the same manner as in Example 3, except that the raw material comprised a resin component comprising 78% (88.6%) of a saturated polyester resin, NE-382 (product of Kao Corp.) and 16% (11.4%) of a styrene-acrylic copolymer resin, CPR-200 (product of Mitsui Toatsu Chemical Go.). there was obtained white, thermal transfer image-receiving paper. This was subjected to the same thermal transfer test as in Example 3. The results are shown in Table 2.

EXAMPLE 7

In the same manner as in Example 3, except that the raw material comprised a resin component comprising 48% (54.6) of a saturated polyester resin, NE-382 (product of Kao Corp.) and 40% (45.4%) of a styrene-acrylic copolymer resin, CPR-200 (product of Mitsui Toatsu Chemical Co.), there was obtained white, thermal transfer image-receiving paper. This was subjected to the same thermal transfer test as in Example 3. The results are shown in Table 2.

COMPARATIVE EXAMPLE 4

In the same manner as in Example 3, except that the raw material comprised a resin component comprising 10% (11.4%) of a saturated polyester resin, NE-382 (product of Kao Corp.) and 78% (88.6%) of a styrene-acrylic copolymer resin, CPR-200 (product of Mitsui Toatsu Chemical Co.), there was obtained white, thermal transfer image-receiving paper. This was subjected to the same thermal transfer test as in Example 3. The results are shown in Table 3.

COMPARATIVE EXAMPLE 5

In the same manner as in Example 3, except that the raw material comprised a resin component of 88% (100%) of only a saturated polyester resin, NE-382 (product of Kao Corp.), there was obtained white, thermal transfer image-receiving paper. This was subjected to the same thermal transfer test as in Example 3. The results are shown in Table 3.

COMPARATIVE EXAMPLE 6

In the same manner as in Example 3, except that the raw material comprised a resin component of 88% (100%) of only a styrene-acrylic copolymer resin, CPR-200 (product of Mitsui Toatsu Chemical Co.), there was obtained white thermal transfer image-receiving paper. This was subjected to the same thermal transfer test as in Example 3. The results are shown in Table 3.

COMPARATIVE EXAMPLE 7

In the same manner as in Example 3, except that the raw material comprised a resin component comprising 84%

(95.5%) of a saturated polyester resin, NE-382 (product of Kao Corp.) and 4% (4.5%) of a styrene-acrylic copolymer resin, CPR-200 (product of Mitsui Toatsu Chemical Co.), there was obtained white, thermal transfer image-receiving paper. This was subjected to the same thermal transfer test as in Example 3. The results are shown in Table 3.

EXAMPLE 8

In the same manner as in Example 3, except that a raw material comprising the following components was used, there was obtained white, thermal transfer image-receiving paper. This was subjected to the same thermal transfer test as in Example 3. The results are shown in Table 3.

| | |
|---|---|
| Saturated Polyester Resin (NE-382, product of Kao Corp.) | 68% (81.0%) |
| Styrene-acrylic Copolymer Resin (CPR-200, product of Mitsui Toatsu Chemical Co.) | 16% (19.0%) |
| Offset Inhibitor (wax, Biscol 330P, product of Sanyo Chemical Co.) | 4% |
| Antistatic Agent (Bontron P-51, product of Orient Chemical Co.) | 2% |
| Titanium Oxide | 5% |
| Amino-modified Silicone Oil (KF-861, product of Shin-etsu Chemical Industry Co.) | 2.5% |
| Epoxy-modified Silicone Oil (KF-102, product of Shin-etsu Chemical Industry Co.) | 2.5% |

EXAMPLE 9

In the same manner as in Example 3, except that a raw material comprising the following components was used, there was obtained white, thermal transfer image-receiving paper. The paper was subjected to the same thermal transfer test as in Example 3. The results are shown in Table 3.

| | |
|---|---|
| Saturated Polyester Resin (NE-382, product of Kao Corp.) | 64% (81.0%) |
| Styrene-acrylic Copolymer Resin (CPR-200, product of Mitsui Toatsu Chemical Co.) | 15% (19.0%) |
| Offset Inhibitor (wax, Biscol 330P, product of Sanyo Chemical Co.) | 4% |
| Antistatic Agent (Bontron P-51, product of Orient Chemical Co.) | 2% |
| Titanium Oxide | 5% |
| Amino-modified Silicone Oil (KF-861, product of Shin-etsu Chemical Industry Co.) | 5% |
| Epoxy-modified Silicone Oil (KF-102, product of Shin-etsu Chemical Industry Co.) | 5% |

COMPARATIVE EXAMPLE 8

In the same manner as in Example 3, except that a raw material comprising the following components was used, there was obtained white thermal transfer image-receiving paper. The paper was subjected to the same thermal transfer test as in Example 3. The results are shown in Table 3.

| | |
|---|---|
| Saturated Polyester Resin (NE-382, product of Kao Corp.) | 71% (80.7%) |
| Styrene-acrylic Copolymer Resin (CPR-200, product of Mitsui Toatsu Chemical Co.) | 17% (19.3%) |
| Offset Inhibitor (wax, Biscol 330P, product of Sanyo Chemical Co.) | 4% |
| Antistatic Agent (Bontron P-51, product of Orient Chemical Co.) | 2% |
| Titanium Oxide | 5% |

COMPARATIVE EXAMPLE 9

In the same manner as in Example 3, except that a raw material comprising the following components was used, there was obtained white, thermal transfer image-receiving paper. The paper was subjected to the same thermal transfer test as in Example 3. The results are shown in Table 3.

| | |
|---|---|
| Saturated Polyester Resin (NE-382, product of Kao Corp.) | 60.5% (80.7%) |
| Styrene-acrylic Copolymer Resin (CPR-200, product of Mitsui Toatsu Chemical Co.) | 14.5% (19.3%) |
| Offset Inhibitor (wax, Biscol 330P, product of Sanyo Chemical Co.) | 4% |
| Antistatic Agent (Bontron P-51, product of Orient Chemical Co.) | 2% |
| Titanium Oxide | 5% |
| Amino-modified Silicone Oil (KF-861, product of Shin-etsu Chemical Industry Co.) | 7% |
| Epoxy-modified Silicone Oil (KF-102, product of Shin-etsu Chemical Industry Co.) | 7% |

TABLE 2

| | Examples | | | Comparative Examples | | | Examples | |
|---|---|---|---|---|---|---|---|---|
| | 3 | 4 | 5 | 1 | 2 | 3 | 6 | 7 |
| Optical Density | | | | | | | | |
| Yellow | 1.72 | 1.70 | 1.71 | 1.35 | — | — | 1.70 | 1.60 |
| Magenta | 1.74 | 1.73 | 1.71 | 1.41 | — | — | 1.69 | 1.63 |
| Cyan | 1.84 | 1.81 | 1.85 | 1.46 | — | — | 1.69 | 1.69 |
| Reliesability from Ink Sheet | A | A | A | A–B | C | C | A | A |
| General Evaluation | A | A | A | A | C | C | A | A |

—: No thermal transfer occurred.

TABLE 3

| | Comparative Examples | | | | Examples | | Comparative | |
|---|---|---|---|---|---|---|---|---|
| | 4 | 5 | 6 | 7 | 8 | 9 | 8 | 9 |
| Optical Density | | | | | | | | |
| Yellow | 1.30 | 1.67 | 1.42 | 1.65 | 1.71 | 1.68 | — | 1.41 |
| Magenta | 1.31 | 1.70 | 1.10 | 1.67 | 1.73 | 1.69 | — | 1.40 |
| Cyan | 1.31 | 1.76 | 1.33 | 1.68 | 1.80 | 1.70 | — | 1.38 |
| Reliesability from Ink Sheet | A | B | A | B–C | A | A | C | A |
| General Evaluation | B–C | B | B–C | B–C | A | A | C | B–C |

—: No thermal transfer occurred.

What is claimed is:

1. A white, powdery coating composition for image-receiving sheets for sublimation thermal transfer recording, which comprises a resin component, a white colorant and a cured product of reaction-curable silicone oils and which is characterized in that the composition comprises, as the resin component, from 70 to 95% by weight of a resin mixture comprising from 50 to 90% by weight of a saturated polyester resin having an acid value of from 1.0 to 20 mg KOH/g and a glass transition point of from 50° to 70° C. And from 10 to 50% by weight of a styrene-acrylic copolymer resin, and from 0.5 to 12% by weight of a cured product of at least two reaction-curable silicone oils having functional groups capable of mutually reacting with each other.

2. The white, powdery coating composition as claimed in claim 1, which further comprises an antistatic agent and/or an offset inhibitor.

3. A method for producing a white, powdery coating composition for image-receiving sheets for sublimation thermal transfer recording, which comprises a resin component, a white colorant, and a cured product of reaction-curable silicone oils; the method comprising melt-kneading under heat a mixture which comprises, as a resin component, from 70 to 95% by weight of a resin mixture comprising from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and from 0.5 to 12% by weight of at least two reaction-curable silicone oils having functional groups capable of mutually reacting with each other.

4. An image-receiving sheet for sublimation thermal transfer recording which has, on a base sheet, a receiving layer which, when a thermal transfer sheet having a layer of dyes on a support is attached thereto under heat, can receive the dyes from the sheet; the image-receiving sheet being characterized in that said receiving layer is a thin, continuous layer made of a white, powdery coating composition comprising a resin component, a white colorant, and a cured product of reaction-curable silicone oils, and that the coating composition comprises, as the resin component, from 70 to 95% by weight of a resin mixture comprising from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and from 0.5 to 12% by weight of a cured product of at least two reaction-curable silicone oils having functional groups capable of mutually reacting with each other.

5. The image-receiving sheet as claimed in claim 4, wherein the receiving layer has a thickness of from 1 to 20 μm.

6. A method for producing an image-receiving sheet for sublimation thermal transfer recording that has, on a base sheet, a receiving layer which, when a thermal transfer sheet having a layer of dyes on a support is attached thereto under heat, can receive the dyes from the sheet; the method being characterized in that a white, powdery coating composition comprising a resin component, a white colorant and a cured product of reaction-curable silicone oils is applied to a base sheet through dry-coating to form thereon a thin, continuous film of a receiving sheet, and that said coating composition comprises, as the resin component, from 70 to 95% by weight of a resin mixture comprising from 50 to 90% by weight of a saturated polyester resin having an acid value of from 1.0 to 20 mg KOH/g and a glass transition point of from 50° to 70° C. and from 10 to 50% by weight of a styrene-acrylic copolymer resin, and from 0.5 to 12% by weight of a cured product of at least two reaction-curable silicone oils having functional groups capable of mutually reacting with each other.

7. The white, powdery coating composition for producing an image-receiving sheet for sublimation thermal transfer recording as claimed in claim 6, wherein the powdery coating composition further comprises an antistatic agent and/or an offset inhibitor.

8. A method for producing an image-receiving sheet for sublimation thermal transfer recording that has, on a base sheet, a receiving layer made of resins which, when a thermal transfer sheet having a layer of sublimable dyes is attached thereto under heat, can receive the dyes from the sheet;

the method being characterized in that a resin-containing, white powdery coating composition is applied onto a base sheet through a charge dispersion process to thereby make the surface of the base sheet partly or wholly coated with the composition, and then the thus-coated base sheet is heated to thereby make the composition melted and fixed thereon to form a continuous film of a receiving layer on the base sheet.

9. A method for producing an image-receiving sheet for sublimation thermal transfer recording that has, on a base sheet, a receiving layer made of resins which, when a thermal transfer sheet having a layer of sublimable dyes is attached thereto under heat, can receive the dyes from the sheet; the method being characterized in that a partly or wholly charged drum is used to transport a powdery coating composition, while the powdery coating composition is charged oppositely to the drum and is adhered to the surface of the drum, and thereafter the composition is transferred onto a base sheet, then heated, melted and fixed to form a continuous film of a receiving layer on the base sheet.

10. A method for producing an image-receiving sheet for sublimation thermal transfer recording that has, on a base sheet, a receiving layer made of resins which, when a thermal transfer sheet having a layer of sublimable dyes is attached thereto under heat, can receive the dyes from the sheet; the method being characterized in that a photoreceptor is rotated while it is partly or wholly charged on its surface, and a powdery coating composition as charged to have a reversed polarity relative to the thus-charged surface of the photoreceptor is adhered to the surface of the photoreceptor, then transferred onto a base sheet, and thereafter heated, melted and fixed on it to form a continuous film of a receiving layer on the base sheet.

11. The method for producing an image-receiving sheet for sublimation thermal transfer recording as claimed in any one of claims 8 to 10, wherein the powdery coating composition contains a white colorant.

12. The method for producing an image-receiving sheet for sublimation thermal transfer recording as claimed in any one of claims 8 to 10, wherein the powdery coating composition contains an antistatic agent and/or an offset inhibitor.

* * * * *